United States Patent [19]

Park et al.

[11] Patent Number: 4,615,961
[45] Date of Patent: Oct. 7, 1986

[54] PROTECTED METAL COMPONENTS

[75] Inventors: George B. Park, Purton, Nr. Swindon; John A. Cook, Faringdon; Robert H. McLoughlin, Swindon, all of England

[73] Assignee: Raychem Corporation, Menlo Park, Calif.

[21] Appl. No.: 667,033

[22] Filed: Nov. 1, 1984

Related U.S. Application Data

[63] Continuation-in-part of Ser. No. 618,094, Jun. 7, 1984, abandoned.

[30] Foreign Application Priority Data

Nov. 2, 1983 [GB] United Kingdom ............... 8329209
Dec. 15, 1983 [GB] United Kingdom ............... 8333385

[51] Int. Cl.$^4$ ...................... H01M 2/16; H01M 2/32
[52] U.S. Cl. .................................. 429/218; 429/246; 29/623.5
[58] Field of Search .............. 429/48, 137, 212, 248, 429/136, 138, 246, 131, 94, 218; 29/623.1, 623.3, 623.5

[56] References Cited

U.S. PATENT DOCUMENTS

| | | | |
|---|---|---|---|
| 779,553 | 1/1905 | Meygret | 429/212 |
| 2,845,469 | 7/1958 | Teigel | 429/137 |
| 2,942,050 | 6/1960 | Denes | 136/3 |
| 3,023,261 | 2/1962 | Louis et al. | 429/137 |
| 3,721,113 | 3/1973 | Hovsepian | 72/46 |
| 4,315,976 | 2/1982 | Conte | 429/218 |
| 4,366,616 | 1/1983 | Catanzarite | 29/623.5 |
| 4,476,624 | 10/1984 | Klein et al. | 29/623.3 |

FOREIGN PATENT DOCUMENTS

| | | | |
|---|---|---|---|
| 2546585 | 4/1977 | Fed. Rep. of Germany | 429/48 |
| 968285 | 9/1964 | United Kingdom . | |
| 1216734 | 12/1970 | United Kingdom . | |
| 1462857 | 1/1977 | United Kingdom . | |
| 1498733 | 1/1978 | United Kingdom . | |
| 1549741 | 8/1979 | United Kingdom . | |

OTHER PUBLICATIONS

Patent Abs. Japan, vol. 8, No. 13 (E-222) (1450), Jan. 20, 1984, (JP 58/176875-A).

Primary Examiner—Donald L. Walton
Attorney, Agent, or Firm—Edith A. Rice; Herbert G. Burkard

[57] ABSTRACT

Continuous metal electrodes are protected by non-porous fluid-impermeable material which is convertible to a fluid-permeable (porous) state, enabling the protective material to act as an electrode separator after the conversion. Conversion by contact with the non-aqueous fluid in a lithium cell is preferred, using strips of lithium protected with a blend of polyethylene and polyethylene oxide, the latter being extractable by the cell liquids.

21 Claims, 10 Drawing Figures

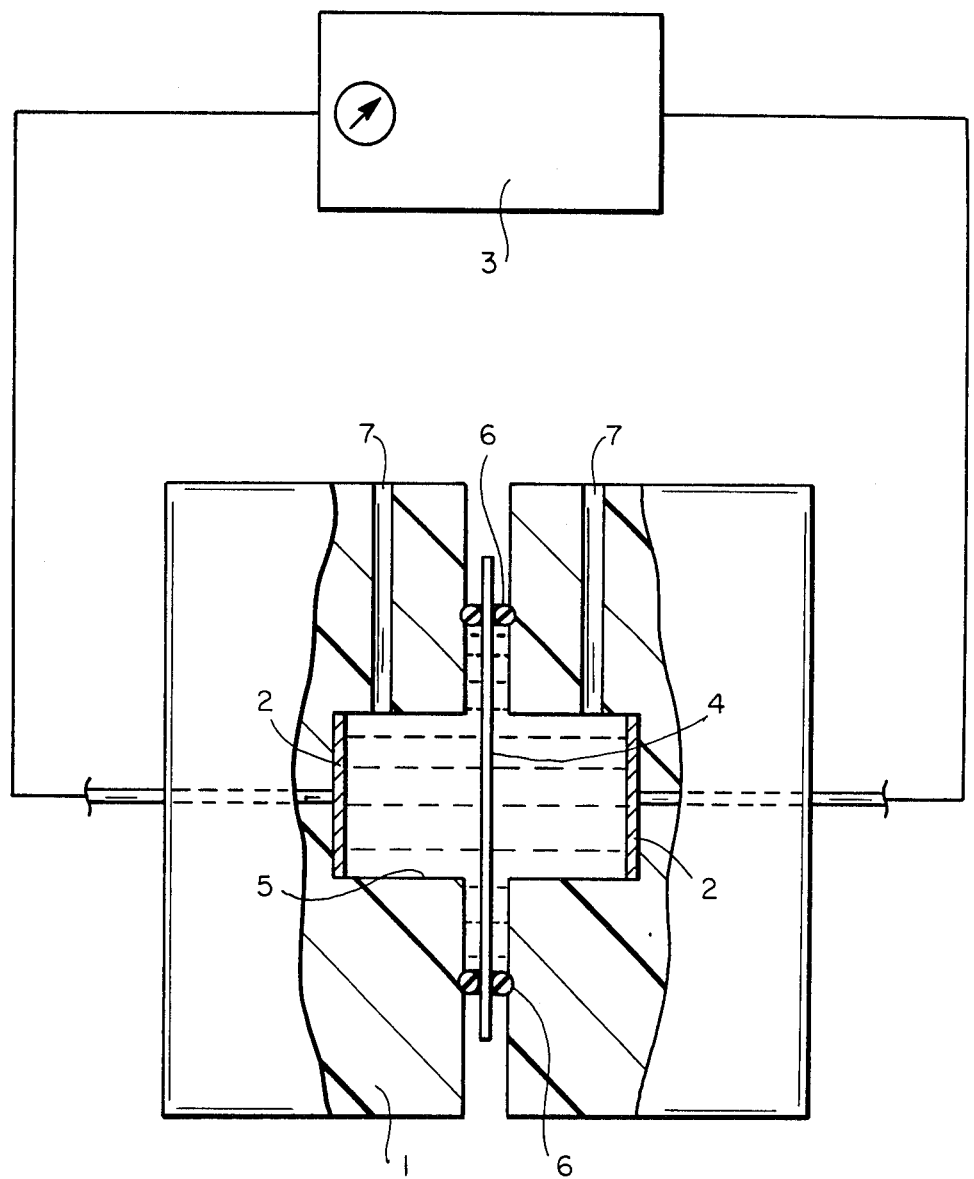
FIG_1

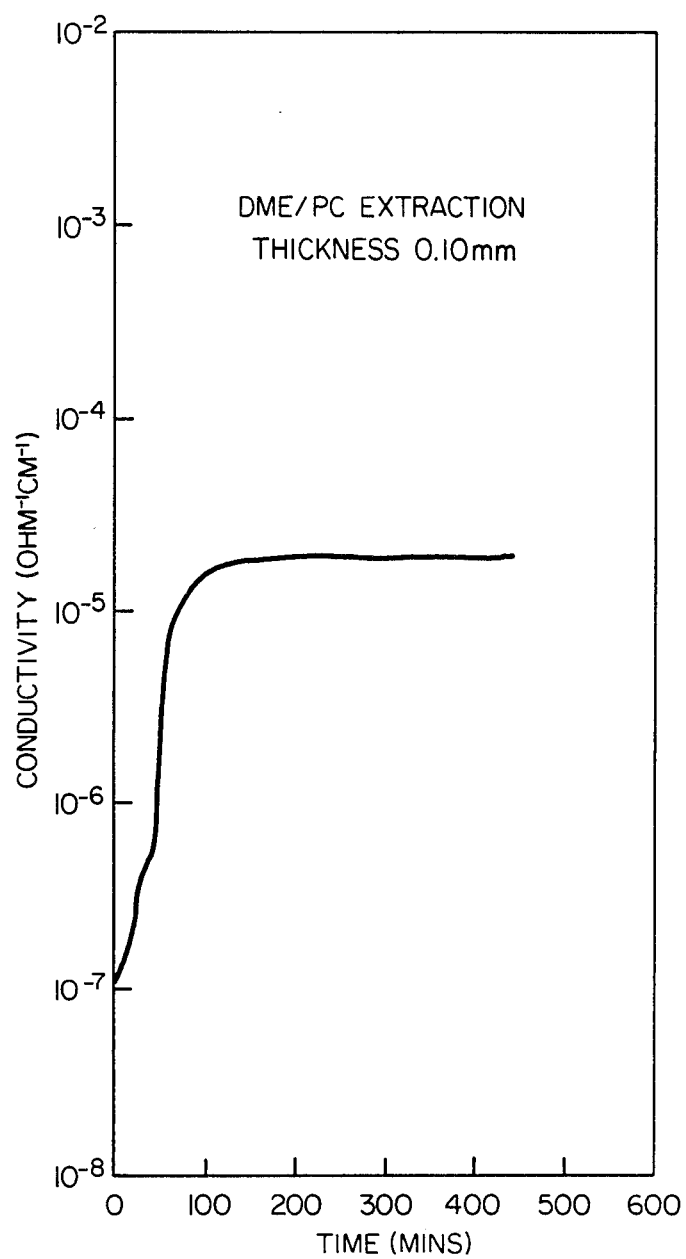
FIG_2

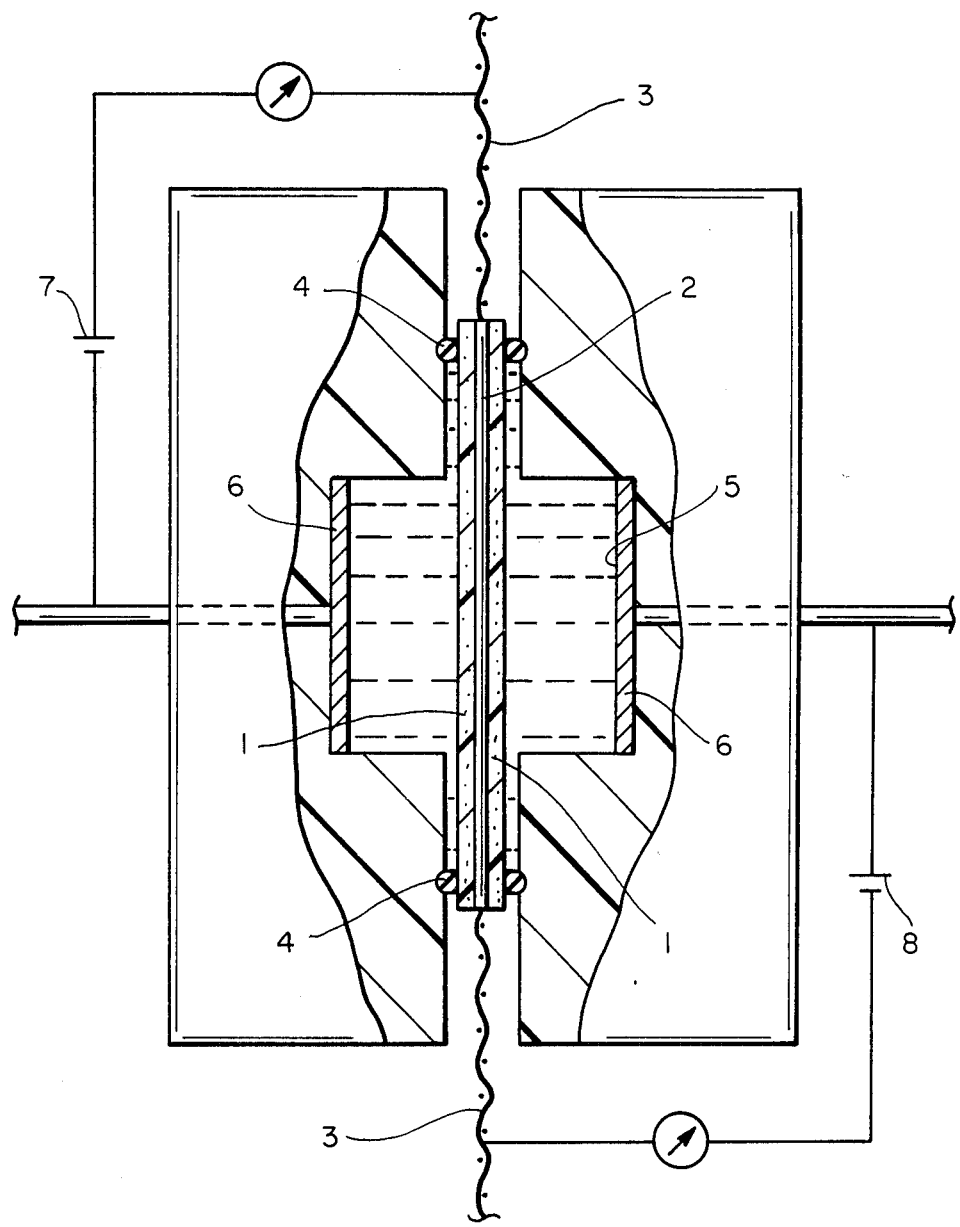
FIG_3

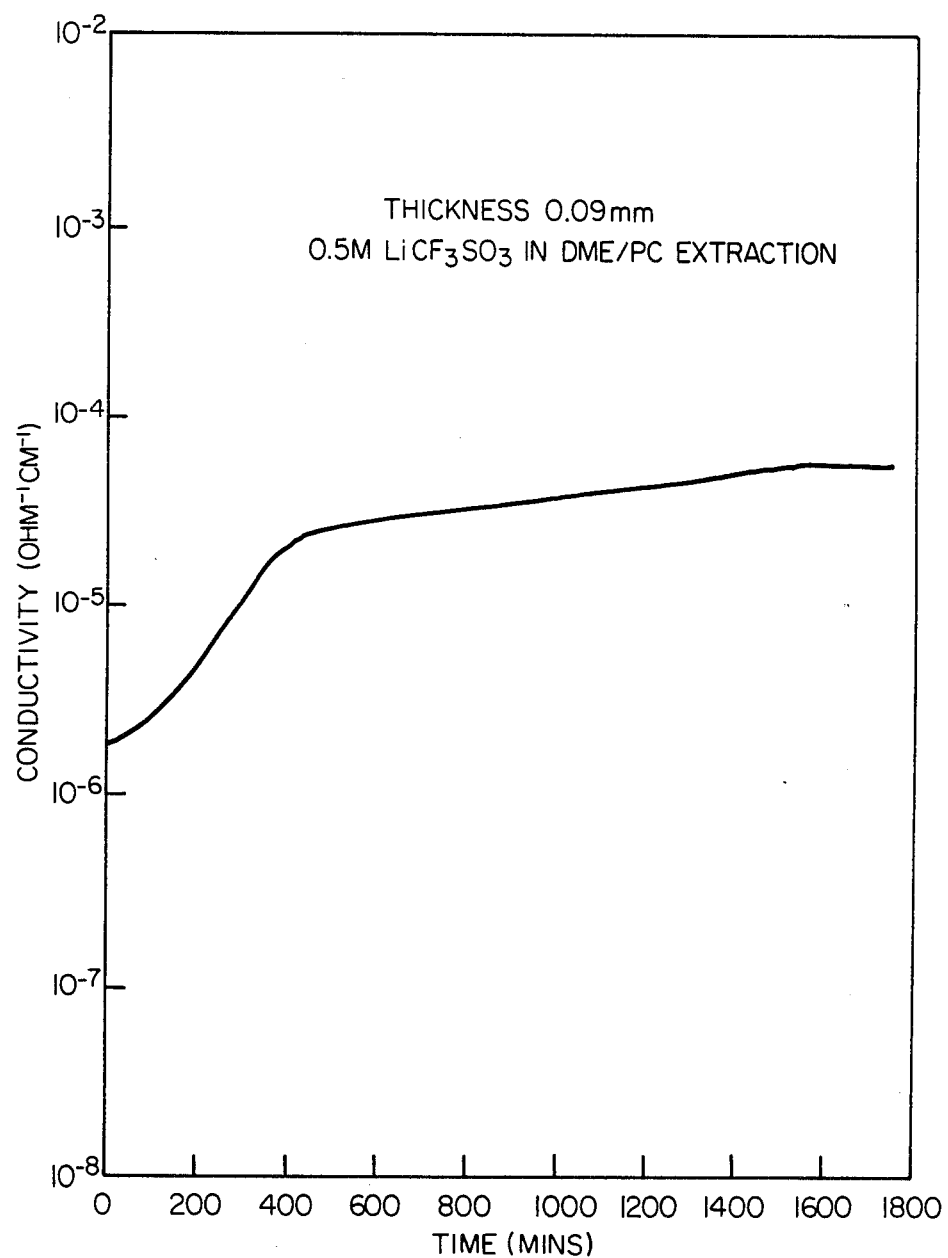
FIG_4

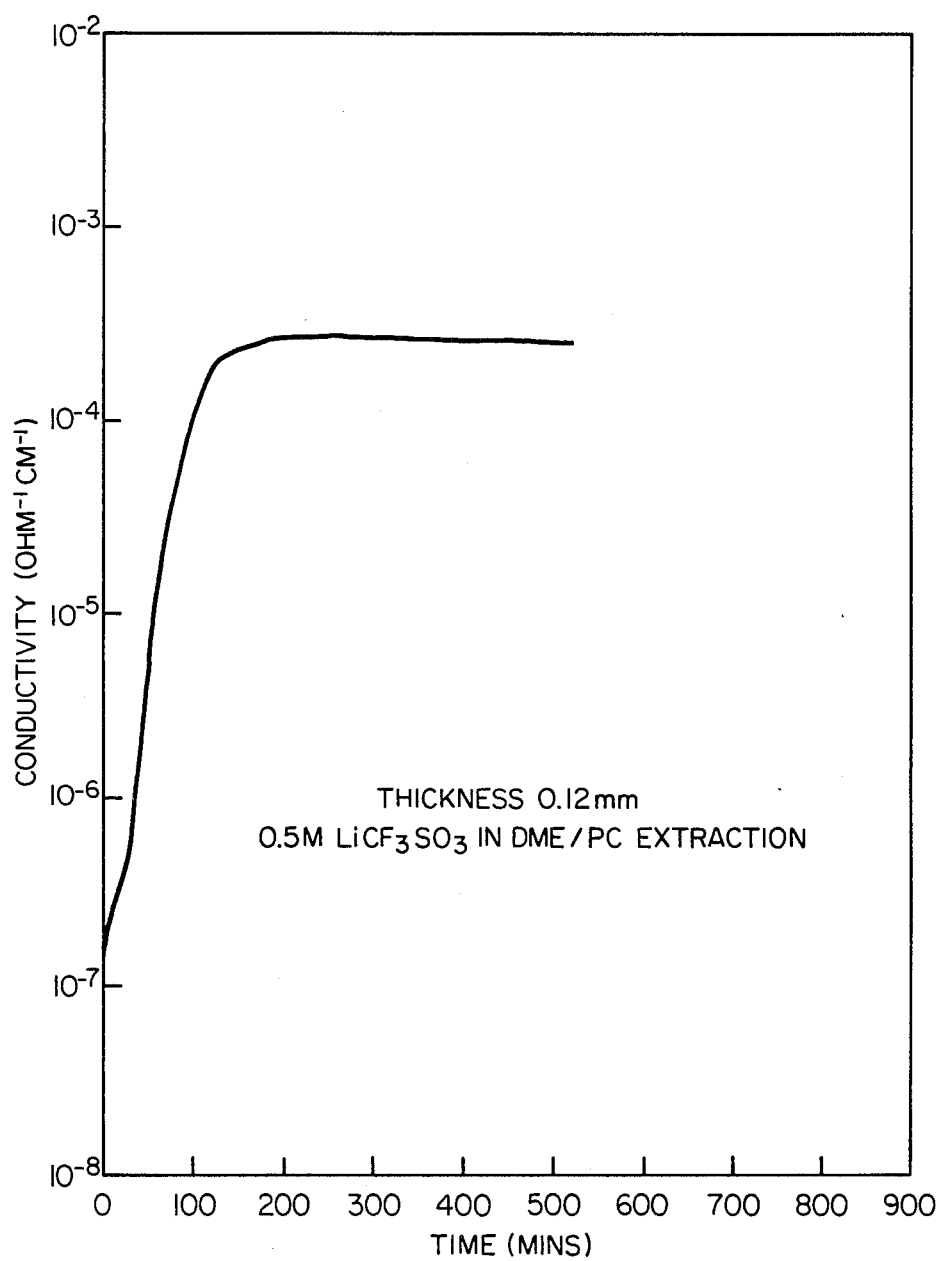
FIG_5

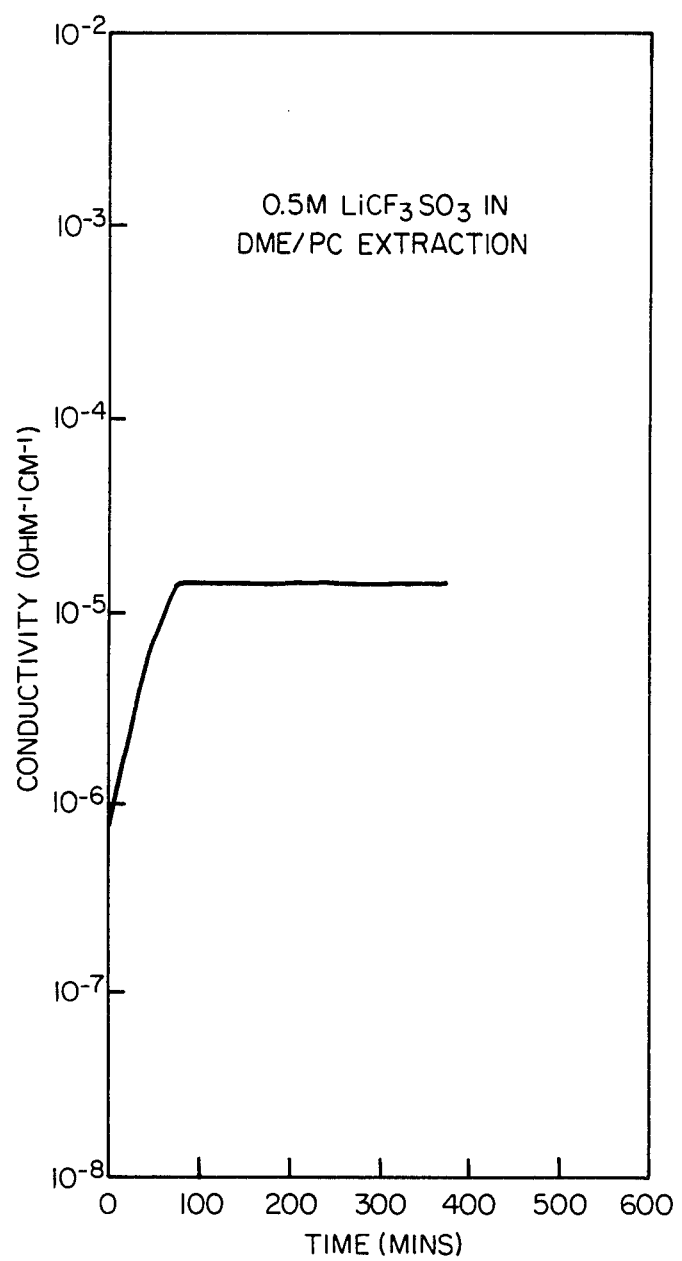
FIG_6

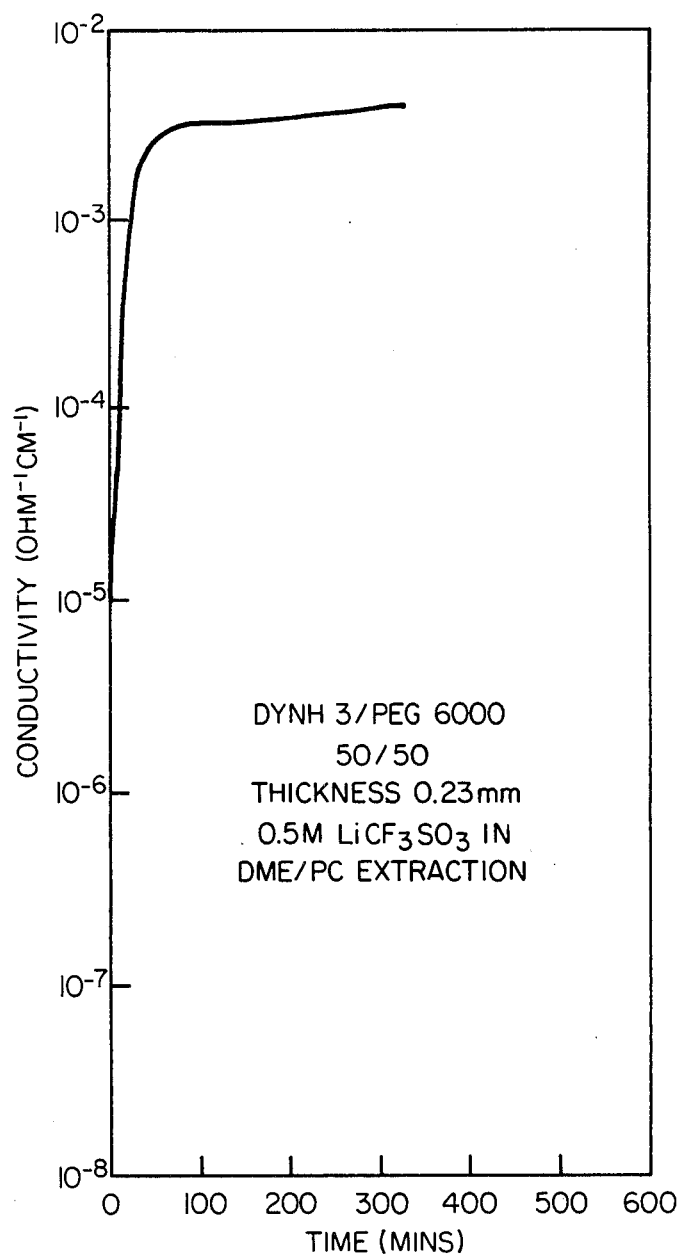
FIG_7

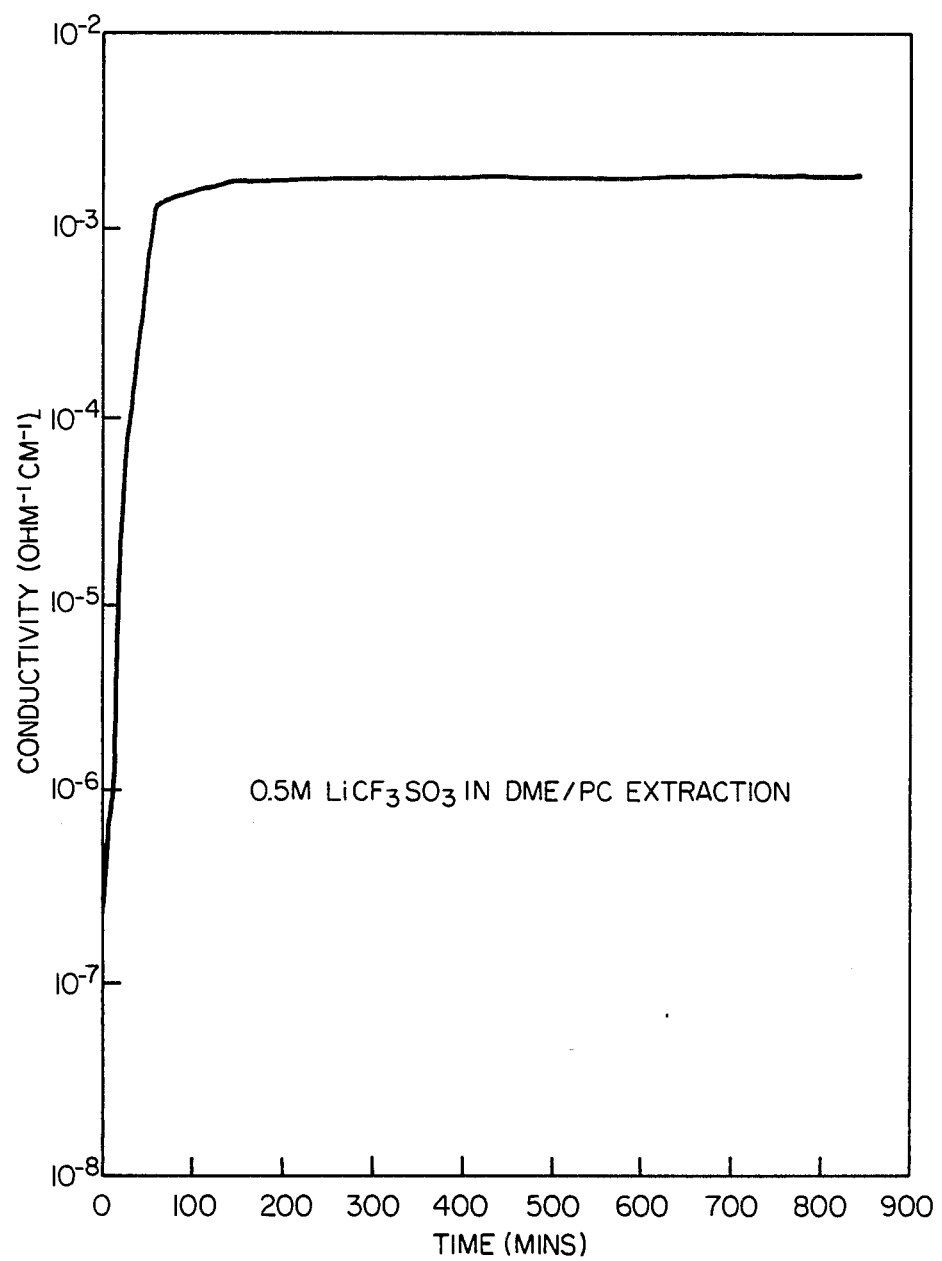
FIG_8

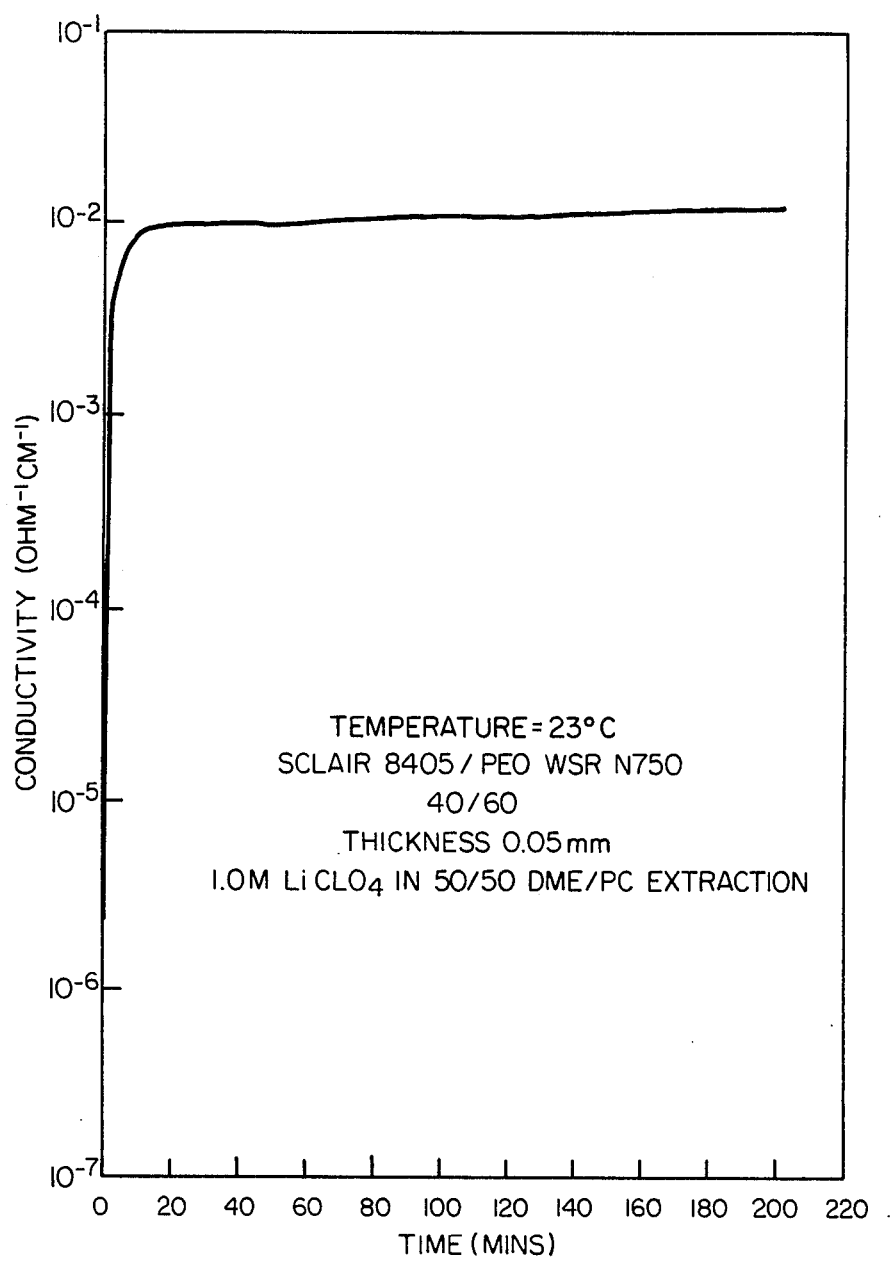
FIG_9

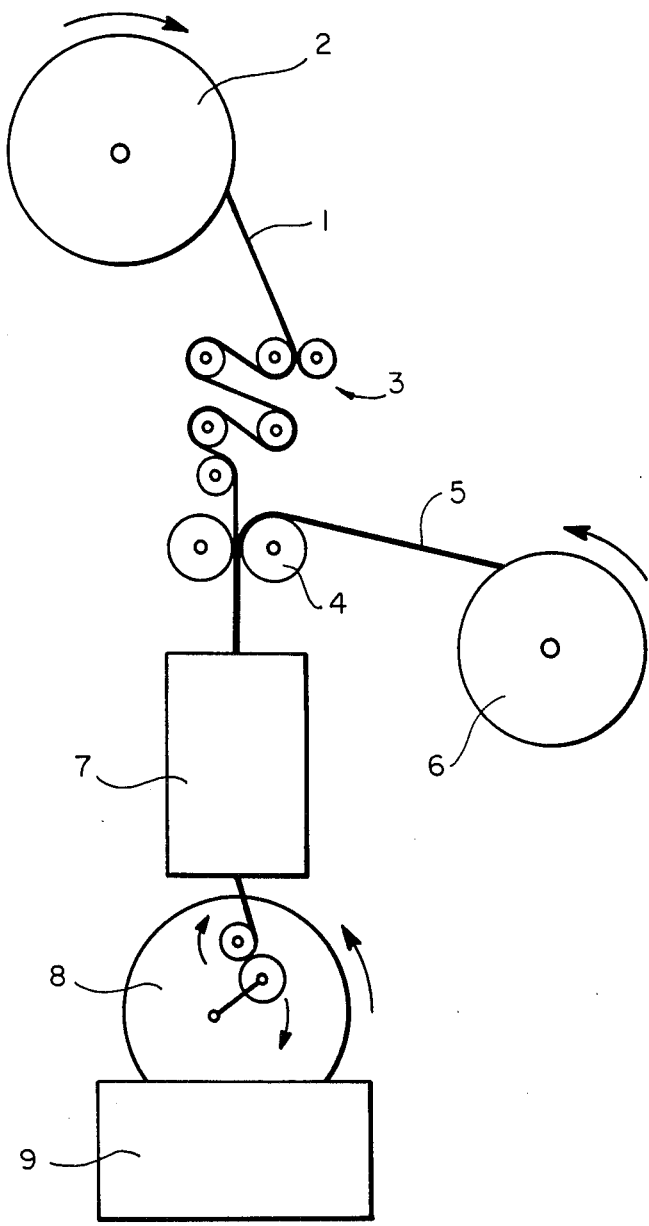
FIG_10

PROTECTED METAL COMPONENTS

CROSS REFERENCES TO RELATED APPLICATIONS

This application is a continuation-in-part of application Ser. No. 618,094 filed June 7, 1984, now abandoned the disclosure of which is incorporated herein by reference.

This invention relates to protective sensitive bodies, especially metal bodies, for example metal electrodes, and the use thereof in electrical devices.

BACKGROUND OF THE INVENTION

Some eletrical components, for example some continuous metal electrodes for electrochemical cells, are sensitive insofar as they are difficult to handle during manufacture of electrical devices owing to physical weakness or high chemical reactivity, which may necessitate inconvenient handling procedures and/or special conditions such as dry room assembly. Examples of such sensitive metal electrodes include alkali metal electrodes and alkaline earth metal electrodes, notably lithium metal electrodes for lithium cells.

Lithium metal is difficult to roll into thin strips for use as an electrode, and U.S. Pat. No. 3,721,113 describes a method of alleviating this difficulty by rolling the lithium between smooth (surface asperities less than one micron) polymeric surfaces having sufficiently low critical surface tension to prevent adhesion to the lithium. The polymer may be a coating on the surface of rolls used to roll the lithium, or may be in the form of sheeting enclosing or facing the lithium, which does not adhere to the lithium and is peeled off the lithium strip after rolling. While this method facilitates the rolling operation, which produces the thin lithium strip, it does not improve the efficiency of assembling the delicate lithium strip into electrical devices.

Numerous variations of the materials and structure of individual cell electrodes have previously been described, with the emphasis on the chemical and electrical performance of the materials and with little attention to the assembly process itself. For example, British Pat. No. 1533279 describes the use of an adherent thin coating of a vinyl polymer film on the surface of lithium strip electrodes for lithium/thionyl chloride cells to prevent electrode passivation, which tends to occur on storage of that particular kind of cell. The vinyl polymer film is insoluble in the thionyl chloride and must not be degraded or decomposed in the presence of the same. It must be sufficiently thin to permit ion transfer between the lithium and the thionyl chloride as required for current flow in operation of the cell. It is stated, though not demonstrated in the examples of the patent, that the vinyl polymer film may also serve as the sole electrode separator of the cell or may permit the use of a thinner separator than would normally be required. Somewhat thicker films of the vinyl polymer are recommended for that purpose, but it is made clear that the ion transfer needed for acceptable electrical performance of the cell will be adversely affected by thus increasing the film thickness. Electrode separators of polystyrene are described in U.S. Pat. No. 4,315,602 for alkaline cells, the separators again being necessarily thin enough to permit ion transfer.

BRIEF DESCRIPTION OF THE DRAWINGS

FIG. 1 shows a conductivity cell for evaluating protective materials of this invention.

FIG. 2 shows the conductivity as a function of time for a low density polyethylene-lithium trifluoromethane-sulfonate blend, upon immersion in a medium of dimethoxyethane-propylene carbonate.

FIG. 3 shows a conductivity cell for evaluating a three layer laminate of protective material/electrode material/protective material.

FIG. 4 shows the conductivity as a function of time for a three layer laminate consisting of lithium metal between two layers of a low density polyethylene-lithium trifluoromethanesulfonate blend, upon immersion in a medium of 0.5M lithium trifluoromethanesulfonate in 50/50 dimethoxyethane-propylene carbonate.

FIG. 5 shows conductivity as a function of time for a medium density polyethylene-lithium trifluoromethanesulfonate blend, upon immersion in a medium of 0.5M lithium trifluoromethanesulfonate in 50/50 dimethoxyethane-propylene carbonate.

FIG. 6 shows the conductivity as a function of time for a construction consisting of lithium metal encapsulated by a low-density polyethylene-lithium trifluoromethanesulfonate blend, upon immersion in a medium of 0.5M lithium trifluoromethanesulfonate in 50/50 dimethoxyethane-propylene carbonate.

FIG. 7 shows the conductivity as a function of time for a low-density polyethylene-poly(ethylene glycol) blend, upon immersion in a medium of 0.5M lithium trifluoromethane-sulfonate dimethoxyethane-propylene carbonate mixture.

FIG. 8 shows conductivity as a function of time for a medium density polyethylene-poly(ethylene oxide) blend, upon immersion in a medium of 0.5M lithium trifluoromethanesulfonate in 50/50 dimethoxyethane-propylene carbonate.

FIG. 9 shows the conductivity as a function of time for a construction consisting of lithium metal encapsulated by a medium-density polyethylene-poly(ethylene oxide) blend, upon immersion in a medium of 1.0M lithium perchlorate in 50/50 dimethoxyethane-propylene carbonate.

FIG. 10 is a schematic of equipment for the production of electrical devices according to the invention.

DETAILED DESCRIPTION OF THE INVENTION

The present invention provides articles whereby significant improvements in the handling of sensitive materials, especially for electrical device assembly processes can be achieved, as hereinafter described.

The present invention provides, in one aspect, an article comprising a continuous metal body, preferably capable of functioning as a continuous metal electrode when incorporated in an electrical device, at least part of which body is protected by substantially non-porous relatively fluid-impermeable flexible protective material the composition of which can be altered while associated with the metal body to render the protective material relatively fluid-permeable.

The article according to this invention has the advantage that it can be further formed to suit its intended end use function, for example by rolling to decrease its thickness e.g. below 0.25 millimeters, preferably below 0.125 millimeters or coiling to form coiled cell electrodes, while the sensitive material is protected from damage and contamination by the non-porous flexible protective material. This aspect of the invention thus provides an article comprising a body of sensitive material at least part of which body is protected by substantially non-porous relatively fluid-impermeable flexible protective material, the body having been deformed so as to increase its surface area while in contact with the protective material and the composition of the protective material being alterable while associated with the body to render the protective material relatively fluid-permeable. The sensitive material (whether deformed or not) is preferably encapsulated (ie. surrounded or enclosed) by the protective material.

This leads to significant improvements in electrical device assembly processes, as will be described hereinafter, and the sensitive material is preferably metal which is malleable under temperatures and pressures which do not unacceptably damage the protective layer. The subsequent convertibility of the protective material in situ (that is without removal from the sensitive material) to the relatively fluid-permeable, preferably porous, state allows relatively thick (and therefore physically protective) layers to be used while achieving adequate permeation by fluid for the end use, for example in electrolytic cells, especially non-aqueous cells, electrodes being an important end use of the protected material of this invention.

The protective material may thus act as an electrode separator, pre-assembled with the electrode material, thus eliminating some of the problems of handling and aligning electrodes and separators during the assembly of electrical devices, especially non-aqueous electrical cells.

The invention also gives rise to advantageous articles suitable for feeding to automatic equipment capable of assembling the said electrical device. The realisation that the protective material will help the sensitive electrode material to withstand the stresses of automated assembly thus leads to important processing advantages. The feedable article is preferably in the form of a thin sheet or elongate strip, preferably a strip of sufficient length to make a plurality of the said electrical devices.

The layer of protective material is preferably able to survive mechanical deformation of the sensitive material in the sense that it will retain its integrity and maintain a useful degree of protection both against mechanical damage and against contamination of the electrode material after a significant amount of deformation, for example for the aforementioned purposes. The precise amount of deformation which the protective material will preferably survive will be a matter of commonsense for practical readers. Brittle layers which would crack so as to reduce the protection unacceptably are thus undesirable, as are materials which would react unacceptably in other ways to such treatment, for example very thin layers which would become unacceptably scuffed or torn.

It will be understood that the sensitive material may require protection for various reasons, for example materials which are subject to attack by atmospheric gases or moisture during storage; materials which may react prematurely with liquid with which they may come into contact during assembly; materials which are subject to poisoning by contaminants during storage; and materials which lack physical strength or integrity and thus require protection from physical damage. The invention is especially useful for materials which require physical protection owing to physical weakness while permitting access of fluids to the material in use but not in storage. The dual function of the convertible protective material according to the present invention is thus highly convenient, since before conversion it will tend to give good protection against damage and contamination, and after conversion the remaining permeable material can provide continued physical support. By suitable selection of its ingredients, the protective material can also be made to perform other secondary functions, for example providing chemical reactants or catalysts in a porous layer on the surface of the sensitive material.

Preferably, the protective material will be sufficiently impermeable at least to hinder, preferably substantially to prevent, the sensitive material from performing its intended end use function and will preferably require the alteration of its composition e.g. to render it porous and thus permeable) to perform that function. Such protective material is distinguished from materials which have no need of compositional change to perform their intended function. If desired, the protective material may have an overlying removable layer of relatively fluid-impermeable material to provide extra protection, the removable material being the same as, or different from, the underlying protective material and preferably being a substantially impervious film (e.g. Saran), which will be removed prior to assembly of the article in an electrical device.

The sensitive material will preferably have an adherent layer of the protective material, or may be enclosed by a non-adherent, preferably self-supporting, layer of the protective material.

The protective material will be selected according to the properties required, and may comprise organic material or polymeric material, organic polymers being preferred, for example polymers of compounds with polymerizable double bonds and condensation polymers of condensable compounds.

Useful polymers of compounds with polymerizable double bonds may be selected from polymers of ethylenically unsaturated hydrocarbons having 2 to 12 carbons, such as ethylene, propylene, n-hexylene, n-dodecene or 4-tert butylstyrene and of vinyl ethers such as methyl or ethyl vinyl ether. Preferred among these compounds are polyethylene and polypropylene due to their low cost.

Copolymers of the above monomeric compounds are also useful.

Useful condensation polymers may be selected from self-condensates of omega-amino-fatty acids and their lactams, such as condensation polymers from caprolactam and from 11-amino-undecanoic acid.

The condensation polymers can be polyamides of diamines having 6 to 9 carbons and dicarboxylic acids having 6 to 10 carbons. Typical useful diamines include hexamethylenediamine, nonamethylenediamine and aryldiamines such as m- and p-phenylenediamine. Typical useful dicarboxylic acids include adipic acid, suberic acid, azelaic acid, terephthalic acid and isophthalic acid. The preferred polyamide is the condensate of hexamethylenediamine and adipic acid, for reasons of general availability.

The condensation polymers can also be selected from polyesters of aryldicarboxylic acids such as phthalic, terephthalic and isophthalic acids and glycols having 2 to 6 carbons, such as ethylene, butylene- and hexyleneglycols.

Useful polymers include

Ethylene/tetrafluoroethylene copolymer (Tefzel Trade Mark)
Ethylene/chlorotrifluoroethylene copolymer
Poly(2-methylpropene)
Polypropylene
Polyethylene
Poly(4-tert-butylstyrene)
Poly(vinyl methyl ether)
Poly(6-aminocaproic acid
Poly(11-aminoundecanoic acid
Poly(ethyleneterephthalate)
Poly(decamethylene sebacamide
Poly(heptamethylene pimelamide)
Poly(octamethylene suberamide)
Poly(nonamethylene azelaamide)
Poly(hexamethylene adipamide)

The protective material can be formulated so as to permit the alteration of its composition either by contact with a fluid, or independently of any fluid contact, for example by heating. In either case, the alteration may involve reaction or decomposition of reactants e.g. blowing agents, present in the composition, or reaction of one or more such reactants with further reactants applied to the composition. It is preferred that the protective material comprise material which is removable to alter its composition as aforesaid, and it can be advantageous to use removable material which, after removal, is capable of participating in the intended end use function of the article. For example, the removal may be effected by contacting the protective material with a fluid, preferably a liquid, which is a component of an electrical device in which the article is to be incorporated in use. In that case, it will be advantageous if the removable material forms an electrolyte solution in the liquid component of the device, preferably an electrolyte liquid, thus participating as a component of the electrolyte. This has the advantage that a cell electrode, for example, may be protected by the protective coating until it is assembled into the cell, whereupon the protective material is converted, by contact with the liquid electrolyte component of the cell, into an electrode separator. The protective composition will preferably be substantially non-reactive with the sensitive material, although useful reactive combinations of sensitive material and protective composition are not excluded. The removable ingredient of the protective material composition may be inorganic, for example a metal salt, lithium bromide, perchlorate and trifluoromethanesulphonate being especially preferred for use on lithium metal electrodes in the aforementioned lithium cells; or it may be an organic material or polymer capable of being leached out or otherwise removed; or it may be a vaporisable or sublimable material.

In electrochemical cells incorporating substantially non-aqueous liquids, the removable material may comprise polymers which are soluble in such liquids, polyethylene oxides being preferred although other polymers may be chosen according to their solubility in the liquid actually used. Liquids used in such cells, for example in lithium cells, may for example include various combinations of propylene carbonate, dimethyl sulphoxide, gamma-butyrolactone, dimethyl formamide, acetonitrile, tetrahydrofuran, 1,2-dimethoxyethane, and dioxolane.

Polyethylene oxides and other polymers may also be useful in cells incorporating aqueous liquids.

Blends of such polymers with polyethylene or other polyolefins are preferred as the protective material.

The protective material composition may be alterable by chemical change instead of, or in addition to, simple removal of material, provided that the chemical change does not unacceptably affect the sensitive material. The composition may comprise at least one ingredient capable of undergoing such chemical change, actuation of which by heat or liquid contact or other means will tend to render the protective composition porous. It will be understood that conversion from a substantially non-porous state to a porous state frequently occurs in practice of this invention and may be preferable in many cases to other ways of achieving fluid permeability, e.g. by conversion of the composition to a liquid-swellable state without rendering it porous.

The sensitive material may be deformed while protected by the protective material so as to reduce the thickness of the sensitive material or to otherwise form it to suit particular end-uses. This has substantial advantages when the sensitive material is highly reactive and/or physically weak (e.g. has lower tensile strength than an equal thickness of the protective material), and is especially useful for making electrodes for electrical devices out of highly reactive and/or weak metals, for example alkali metals or alkaline earth metals.

Such devices, for example lithium cells, may use thin strips or sheets of the reactive metal as electrodes, and the cost and difficulty of handling such metals tends to increase rapidly as the thickness decreases. Rolling of lithium strips to reduce their thickness, e.g. below that of relatively cheap 0.25 millimeters stock, preferably below 0.125 millimeters, for example to 0.075 millimeters, can be effected relatively easily while the lithium is protected by the protective material according to this invention, since the protective material greatly reduces the likelihood of fracturing of the metal and provides a readily handleable product.

The protective material may be deformed, either independently or in connection with deformation of the sensitive material, to facilitate subsequent alteration of its composition to render it relatively fluid-permeable. For example, deformation by stretching of a protective material containing removable material as aforesaid may facilitate the removal.

The article may include at least one additional material capable of functioning in the end use of the article in addition to the sensitive material and the protective material. For example a current collector or an anti-passivation coating may be present on one or both faces of a lithium electrode, and it will be appreciated that references to the protective material "protecting" or "adhering to" the sensitive material do not exclude such possibilities of one or more materials intervening between the sensitive material and the protective material.

This invention includes the method of making the article comprising the protected body of sensitive material on the general principles herein described, and electrical devices incorporating such an article, especially where the protective material has been converted, preferably in situ in the device, into the fluid permeable state. Of particular interest are those devices wherein the sensitive material acts as an electrode and the permeable protective material acts as an electrode separator.

The invention also provides a method of making an electrical device comprising (a) providing an article of the kind hereinbefore referred to; (b) altering the composition of the protective material to render it relatively fluid-permeable; and (c) incorporating the article in the device.

The alteration may be effected either before or after the article is incorporated in the device using any of the aforementioned techniques as appropriate. The method may include the step of (d) deforming the sensitive material while protected by the protective material, so as to alter its surface configuration and/or to decrease the thickness of the sensitive material, and/or to coil or otherwise arrange it, as hereinbefore discussed.

The invention lends itself to efficient assembly methods wherein the article according to the invention is fed to apparatus which assembles portions of the article into a plurality of electrical devices, especially where the apparatus receives a substantially continuous feed of the article and automatically assembles successive portions thereof into a succession of the electrical devices. Production equipment capable of carrying out an automated process of this kind can readily be devised, given the article and other principles outlined herein.

The advantages of such an automated process over the piece-by-piece hand assembly methods hitherto used in the absence of the articles according to this invention, especially for alkali metal or alkaline earth metal electrode materials, will be appreciated. The protective material could be of elongate form and not adherent to the sensitive material, for example in the form of a tube surrounding a strip of the sensitive material, but adherent protective material is preferred, for which purpose the protective material may have suitable surface properties such as surface asperities greater than one micron.

Electrode articles according to this invention can be assembled with the opposing electrode material and other components of an electrical device with fewer difficulties than are encountered in handling and aligning unprotected electrode materials, especially reactive metals such as alkali metals or alkaline earth metals. The anode or the cathode, or both, of suitable electrical devices, for example electrical cells, may be provided by way of articles according to this invention, reactive metal anodes, especially lithium anodes, for electrical cells being an important practical application of the invention. If the articles include other components such as the aforementioned current collector layers or antipassivation layers on part of the sensitive material, e.g. on one major surface of a flat strip electrode, the other components may be overlaid by the protective material as aforesaid. However, other arrangements may be contemplated to suit other additional components incorporated in the articles of this invention.

The protective material may be prepared in any convenient way, for example by melt blending suitable organic polymeric material with removable materials as aforesaid or by solution blending such ingredients in a suitable solvent. Application to the sensitive material will naturally be effected by methods which do not unacceptably affect the sensitive material, and the protective material itself will preferably not interact with the sensitive material, although beneficial interactions are not excluded. Pressure lamination, extrusion coating and solvent casting may be mentioned as examples of methods for producing and applying the protective materials. The protective material will be formulated to achieve the void volume, pore size, uniformity and other characteristics necessary for its intended end use, for example by selecting appropriate particle size and/or loading of a removable material as aforesaid, and/or controlling its degree of dispersion in the protective material. The properties can also be adjusted by mechanical deformation of the protective material, especially by stretching.

It is an advantage of the adherent protective layers of the present invention that higher pore volumes, may be achievable than are possible with known separator films which are limited by the need to retain physical integrity before assembly with the electrode material.

Cross-linked protective materials, especially polymers cross-linked by ionising radiation, or by the action of suitably reactive removable materials, may have beneficial temperature or solvent resistance or other desirable properties, especially when cross-linked to a gel content of at least 40%, preferably at least 60%, as measured by ANSI/ASTM D2765-68.

Some embodiments of the invention as applied to lithium electrode materials will now be described by way of illustration.

EXAMPLE 1

A series of blends was prepared by melt mixing techniques based upon the combination of polyethylene and a lithium salt. Table 1 indicates the contents of the various blends. DYNH-3 is a low density polyethylene from Union Carbide. Sclair 8405 is a medium density polyethylene from Du Pont. Lithium Bromide (LiBr) was supplied by Chemetal GmbH, and lithium trifluoromethanesulphonate ($LiCF_3SO_3$) was supplied by 3M Company.

Plaques of these materials were compression moulded at a temperature of 120° C. to thicknesses from 0.1 mm to 0.3 mm.

TABLE 1

|  | 1 | 2 | 3 | 4 | 5 | 6 |
|---|---|---|---|---|---|---|
| Dynh-3 | 100 | 100 | 100 | — | — | — |
| Sclair 8405 | — | — | — | 100 | 100 | 100 |
| LiBr | 100 | — | — | 100 | — | — |
| $LiCF_3SO_3$ | — | 75 | 100 | — | 75 | 100 |

|  | 7 | 8 | 9 | 10 | 11 | 12 | 13 |
|---|---|---|---|---|---|---|---|
| Dynh-3 | 100 | | | | | | |
| Sclair 8405 | | 100 | 100 | 100 | 100 | 100 | 100 |
| LiBr | — | — | — | — | — | — | — |
| $LiCF_3SO_3$ | — | — | — | — | — | — | — |
| PEG6000 | 100 | — | — | — | — | — | — |
| PEG14000 | — | 100 | — | — | — | — | — |
| PEG35000 | — | — | 100 | — | — | — | — |
| PEOWSRN750 | — | — | — | 150 | 100 | 67 | 42 |

EXAMPLE 2

Plaques, produced as in Example 1, were evaluated for conduction through their thickness as a function of time of contact with suitable solvents. The conductivity cell as shown in FIG. 1 of the accompanying drawings was used for the evaluations. As shown in FIG. 1, the cell comprises a container 1 incorporating electrodes 2 of stainless steel connected to a DC conductance bridge 3. A sample 4 to be tested is sealed into the test chamber 5 by sealing gaskets 6, and the necessary conductive liquid is introduced via feed ports 7.

Solvents used to extract the salt from the polyethylene matrix were dimethoxyethane (DME), propylene carbonate (PC) and acetonitrile (ACN). Mixtures of DME and PC were also used as were solutions of these solvents containing either lithium bromide or lithium trifluoromethanesulphonate, or lithium perchlorate.

FIG. 2 of the accompanying drawings shows typical data for blend 2 from Table 1 above with an increase in conductivity across the plaques as a function of time of contact with solvent, i.e. salt extraction time.

EXAMPLE 3

Plaques prepared as in Example 1 were press laminated with lithium metal at a temperature of 110° C. Blend 2 from table 1 was used as the protective composition and was 0.1 millimeters thick. Lithium metal, as supplied by Foote Mineral Co. was 0.25 millimeters thick.

The composite was evaluated as in Example 2 using the conductivity test cell referred to in that example. FIG. 3 of the accompanying drawings shows the arrangement where the three layer laminate was tested. A sample of the laminate of salt-filled polymer (1) with connections to the lithium (2) made by pieces of nickel mesh (3) was sealed in the conductivity cell by O-rings (4) as shown in the accompanying drawing. The electrolyte 0.5 MOLAR $LiCF_3SO_3$ in 50/50 DME/PC was added and the conductance of the polymer measured on both sides of the lithium using electrodes (6) in conductance bridges (7,8).

FIG. 4 of the accompanying drawings shows the increase in conductivity across the protective material as it is converted to the separator by extraction of the lithium salt into the solvent.

EXAMPLE 4

The laminate of lithium with lithium salt filled polyethylene, produced as in Example 3, was used to prepare a battery with a manganese dioxide based cathode forming the alternative electrode.

The two electrodes were wound together to produce a spiral cell and electrolyte based upon a 50:50 solution of dimethoxyethane and propylene carbonate containing 0.5M lithium trifluoromethanesulphonate was added prior to sealing the cell against the environment.

The initial open cell voltage (VOC) was 3.37 V and the initial internal resistance of the cell was found to be 2370 ohms. The initial closed cell voltage (VCC) was 2.3 V on a 5000 ohm load.

The cell remained on open circuit for 18 hours with a VOC of 3.29 V following this period. After a further 9 hours on load (5 Kohm) the VOC was 2.58 V with an internal cell resistance of 570 ohm.

EXAMPLE 5

Blends as described in Example 1 were formed into tapes using a single screw extruder (32 mm Baughn single screw, L/D ratio 25/1). The tape was produced in thickness from 0.1 to 0.4 mm. Conductivity tests were done on these materials using the cell as shown in FIG. 1. (See Example 2). Data are shown in FIG. 5 of the accompanying drawings for a tape based upon the Composition 5 from Example 1. The solvents used in the test were dimethoxyethane and propylene carbonate in a 50:50 blend with lithium trifluoromethanesulphonate present to a concentration of 0.5M.

EXAMPLE 6

The blends as noted in Example 1 were used to produce an encapsulant for lithium. The Baughn 32 mm single screw extruder (L/D ratio 25/1) was used with lithium foil as supplied by Foote Mineral Co. fed through a crosshead die and encapsulated in a drawn down tube of polyethylene with the appropriate additive. Lamination was completed by drawing the composite between nip-rollers immediately following extrusion.

Final lithium thickness varied between 0.05 millimeters and 0.25 millimeters. Lithium widths varied between 7 and 38 millimeters. The encapsulant was provided in thicknesses ranging from 0.025 to 0.2 millimeters.

The laminate of lithium plus encapsulant was evaluated as in Example 3 with the lithium used as one of the electrodes connected to the conductance bridge. FIG. 6 of the accompanying drawings shows the conductivity across the encapsulant made from blend 2 of Table 1 above as it is converted to the separator by the extraction of the lithium salt into the solvent.

EXAMPLE 7

The encapsulated lithium produced as in Example 6 was used to prepare a battery. Blend 5 of Table 1 was the coating material used. A battery was fabricated as in Example 4.

The initial open cell voltage (VOC) was 3.43 volts and the initial internal cell resistance was 810 ohms. The initial closed cell voltage (VCC) on a 5.1k ohm load was 2.96 volts.

After standing on open circuit for 1 hour the cell VOC was 3.22 volts and internal cell resistance had fallen to 560 ohms. The VCC on a 5.1k ohm load was 2.90 volts.

EXAMPLE 8

Blend 7 from Table 1 above was compression moulded to form thin plaques and then used in tests to determine the effect on conductivity across the plaques of contact with solvents such as dimethoxyethane and propylene carbonate.

The conductivity cell as described in Example 2 was used and FIG. 7 of the accompanying drawings shows conductivity across the thin plaques as a function of time of exposure to solvent.

EXAMPLE 9

Blends 10 and 13 from Table 1 were prepared in thin film form and used to determine the effect of electrolyte solution on removal of the polyethylene oxide from the polymer matrix.

Conductivity tests using the cell as noted in Example 2 were conducted and table 2 shows the initial and final conductivities from these tests. The materials were tested as produced in plaque form and following stretching by 2-3x FIG. 8 shows graphically results for blend 10.

TABLE 2

| Blend No | Stretched or Unstretched | Thickness mm | Initial Cond $ohm^{-1} cm^{-1}$ | Final Cond $ohm^{-1} cm^{-1}$ |
|---|---|---|---|---|
| 10 | U | 0.21 | $2.3 \times 10^{-7}$ | $1.8 \times 10^{-3}$ |
|  | S | 0.25 | $2.3 \times 10^{-7}$ | $1.8 \times 10^{-3}$ |
| 13 | U | 0.35 | $1.9 \times 10^{-7}$ | $2.5 \times 10^{-7}$ |
|  | S | 0.10 | $3.8 \times 10^{-7}$ | $1.6 \times 10^{-3}$ |

The electrolyte used for these tests was 0.5M $LiCF_3SO_3$ in a 50/50 mixture of dimethoxyethane and propylene carbonate.

EXAMPLE 10

Blend number 10 of Table 1 was coated ont lithium using the procedure described in Example 6. The lithium tape was initially 0.66 millimeters thick and 38 millimeters wide. After encapsulation and drawing the lithium thickness was reduced to 0.15 millimeters and the coating thickness was 0.05 millimeters.

The laminate of lithium plus coating was evaluated as in Example 3 with the lithium used as one of the electrodes connected to the conductance bridge. The electrolyte used for the evaluation was 1.0 Molar lithium perchlorate (LiClO$_4$) in a 50:50 mixture of 1,2 dimethoxyethane and propylene carbonate. FIG. 9 of the accompanying drawings shows the conductivity across the coating as it is converted to the separator by the extraction of the polyethylene oxide into the electrolyte.

EXAMPLE 11

The encapsulated lithium produced in Example 10 was used to prepare a battery. The battery was fabricated as in Example 4. The electrode lengths were 210 millimeters and the electrolyte was 1.0 Molar lithium perchlorate in a 50:50 mixture of 1,2 dimethoxyethane and propylene carbonate.

30 minutes after the addition of the electrolyte the battery had an open cell voltage (VOC) of 3.57 volts and an internal cell resistance of 1.30 ohms. After standing on open circuit for 40 hours the battery VOC was 3.40 volts and the internal cell resistance was 1.23 ohms.

The battery was discharged through a 47 ohm load at 23° C. to a 2.0 volt cut-off. The capacity obtained was 2187 mAh which corresponded to an efficiency of 74.7% with respect to the cathode

EXAMPLE 12

The encapsulated lithium produced in Example 10 was evaluated as in Example 3 with a variety of different electrolytes. All the electrolytes contained 1 Mole of the lithium salt. Mixed solvent electrolytes contained equal amounts of each solvent. Table 3 summarises the results obtained.

TABLE 3

| Electrolyte | Initial Conductivity (ohm$^{-1}$ cm$^{-1}$) | Final Conductivity (ohm$^{-1}$ cm$^{-1}$) | Time to Equilibrium (Minutes) |
| --- | --- | --- | --- |
| LiClO$_4$/PC | 1.1 × 10$^{-8}$ | 8.0 × 10$^{-4}$ | 20 |
| LiClO$_4$/GBL | 1.4 × 10$^{-7}$ | 1.0 × 10$^{-3}$ | 15 |
| LiClO$_4$/DME + GBL | 1.0 × 10$^{-8}$ | 1.0 × 10$^{-3}$ | 10 |
| LiBF$_4$/PC | 5.6 × 10$^{-7}$ | 3.2 × 10$^{-3}$ | 10 |
| LiBF$_4$/GBL | 4.7 × 10$^{-7}$ | 4.3 × 10$^{-3}$ | 10 |
| LiBF$_4$/DME + GBL | 4.8 × 10$^{-7}$ | 4.6 × 10$^{-3}$ | 10 |

Test temperature = 23° C.
GBL = Gamma Butyrolactone

EXAMPLE 13

FIG. 10 of the accompanying drawings illustrates schematically electrical cell production equipment capable of performing a method of making an electrical device according to this invention.

Referring to FIG. 10, a strip (1) of lithium anode material protected by encapsulating protective material according to the invention is fed from a supply roll (2) via feed rolls (3) to lay-up rolls (4) where a strip (5) of cathode material from feed roll (6) is closely aligned with the protected anode, the non-porous protective material carried by the lithium anode being between the anode and the cathode. The aligned anode/cathode assembly then proceeds to a spool threading unit (7) and thence to a spool winding unit (8) wherein the assembly is coiled or spooled to provide a coiled electrode assembly. The coiled assembly then passes to the spool casing unit (9), where the coiled assembly is placed in a cell casing together with suitable electrolyte liquid which subsequently acts to extract the salt from the protective polymer, thus altering its composition to convert it into a porous electrode separator. Suitable practical embodiments of the production equipment thus schematically described can readily be devised.

The electrode article according to this invention may be assembled with a melt extruded cathode material, preferably an electrically conductive composite comprising polymeric material and a suitable cathodic filler, for example polyethylene oxide filled with manganese dioxide. The cathode may be extruded directly onto the protected anode material and other components such as current collectors to produce an electrical device.

It may be desirable to cause the cathode, whether extruded or not, to be porous so as to permit access of electrolyte liquid through the cathode to the other components of the device.

We claim:

1. An electrode article comprising a continuous body of an alkali or alkaline earth metal, at least part of which body is protected by a layer of substantially non-porous, relatively fluid-impermeable flexible polymeric protective material; said protective material having a component which can be removed while said protective material is protecting said body to render said protective material relatively fluid permeable and said body having been deformed so as to decrease its thickness, thereby substantially increasing its surface area, while it is in contact with said protective material.

2. An electrode article according to claim 1, wherein said body has a tensile strength less than that of an equal thickness of said protective material.

3. An electrode article according to claim 1, wherein said body comprises lithium metal.

4. An electrode article according to claim 1, wherein said body has been deformed to a thickness of less than 0.125 millimeters.

5. An electrode article according to claim 1, wherein said body has been deformed to a thickness of less than 0.075 millimeters.

6. An electrode article according to claim 1, wherein the removable component of said protective material can be removed independent of any fluid contact.

7. An electrode article according to claim 1, wherein the removable component of said protective material can be removed by heating.

8. An electrode article according to claim 1, wherein the removable component of said protective material can be removed by contacting said protective material with a fluid.

9. An electrode article according to claim 1, wherein the removable component of said protective material comprises an organic polymer.

10. An electrode article according to claim 9, wherein the removable component is selected from the group consisting of poly(ethylene oxide) and poly(ethylene glycol).

11. An electrode article according to claim 1, wherein the removable component of said protective material is selected from the group consisting of lithium bromide and lithium trifluoromethanesulfonate.

12. An electrode article according to claim 1, wherein the removable component of said protective material is in the form of an overlying layer of relatively fluid impermeable material.

13. An electrode article according to claim 1, wherein said protective material is capable of functioning as an electrode separator after having been rendered relatively fluid permeable by the removal of the removable component.

14. An electrical device incorporating an electrode article comprising a continuous body of an alkali metal or an alkaline earth metal, at least part of which body is protected by a layer of substantially non-porous relatively fluid-impermeable flexible polymeric protective material; said protective material comprising a component which can be removed while said protective material is protecting said body to render said protective material relatively fluid permeable and said body having been deformed so as to decrease its thickness, thereby substantially increasing its surface area, while in contact with said protective material.

15. An electrical device according to claim 14, wherein said protective material has been rendered relatively fluid permeable after incorporation of said article in said device.

16. An electrical device according to claim 14, wherein said protective material has been rendered relatively fluid-permeable by extraction of the removable component from said protective material into liquid incorporated in the device.

17. An electrical device according to claim 14, wherein said electrical device is a non-aqueous electrochemical cell in which said body acts as an electrode and said protective material acts as an electrode separator.

18. A method of making an electrode article, comprising the steps of:
(a) providing a continuous body of an alkali metal or an alkaline earth metal;
(b) protecting at least part of said body with a layer of substantially non-porous relatively fluid-impermeable flexible polymeric protective material having a component which can be removed while said protective material is protecting said body, to render said protective material relatively fluid permeable; and
(c) deforming said body so as to decrease its thickness, thereby substantially increasing its surface area, while in contact with said protective material.

19. A method of making an electrode article according to claim 18, wherein in said protecting step said protecting material is melt extruded onto said body.

20. A method of making an electrical device, comprising the steps of:
(a) providing a continuous body of an alkali metal or an alkaline earth metal;
(b) protecting at least part of said body with a layer of substantially non-porous relatively fluid-impermeable flexible polymeric protective material having a component which can be removed while said protective material is protecting said body, to render said protective material relatively fluid permeable;
(c) deforming said body so as to decrease its thickness, thereby substantially increasing its surface area, while in contact with said protective material;
(d) removing the removable component of said protective material, thereby rendering said protective material relatively fluid permeable; and
(e) incorporating said body and protective material in said electrical device.

21. A method of making an electrical device, according to claim 20, wherein said removing step is performed after said incorporating step.

* * * * *